United States Patent [19]
Guenther

[11] 3,948,227  
[45] Apr. 6, 1976

[54] STRATIFIED CHARGE ENGINE

[76] Inventor: William D. Guenther, R.R. 2, Hagerstown, Ind. 47346

[22] Filed: Mar. 8, 1974

[21] Appl. No.: 449,241

[52] U.S. Cl. ........ 123/32 SP; 123/75 B; 123/190 A; 123/190 B; 123/190 BD; 123/80 BA
[51] Int. Cl.² .................... F02B 19/10; F01L 7/00
[58] Field of Search ........... 123/32 ST, 32 SP, 75 B, 123/80 BA, 33 VC, 190 R, 190 B, 190 BB, 190 BD, 190 D, 190 C, 127

[56] References Cited
UNITED STATES PATENTS

| | | | |
|---|---|---|---|
| 194,047 | 8/1877 | Otto | 123/75 B |
| 1,594,664 | 8/1926 | Congellier | 123/75 B |
| 1,902,069 | 3/1933 | Haller | 123/190 BB |
| 2,007,608 | 7/1935 | Kettering | 123/75 B |
| 2,155,143 | 4/1939 | McDermett | 123/190 BB |
| 3,842,810 | 10/1974 | Yagi | 123/32 ST |

*Primary Examiner*—Charles J. Myhre  
*Assistant Examiner*—Ronald B. Cox  
*Attorney, Agent, or Firm*—Richard D. Emch; Vincent L. Barker, Jr.; Robert E. Pollock

[57] ABSTRACT

An apparatus for applying a stratified charge to a reciprocating internal combustion engine is disclosed. The apparatus comprises a cylindrical rotary valve body disposed for rotation within the head of an internal combustion engine. The valve body defines diametrically extending inlet and exhaust passages which, during rotation of the valve body, place a cylinder of the engine in sequential communication with an inlet manifold and an exhaust manifold secured to the head. The inlet manifold comprises a double-passage gallery for transporting a lean fuel/air charge in a first passage and a rich fuel/air charge in a second passage. Rotation of the inlet passage into communication with the cylinder also brings the inlet passage into sequential communication with the first throat and then the second throat for transporting the first lean charge and then the second rich charge to the cylinder. Means are also provided for shielding the exhaust passages from excessive exhaust heat; for sealing the rotary valve body and for controlling the timing of the valve in response to engine demand.

14 Claims, 20 Drawing Figures

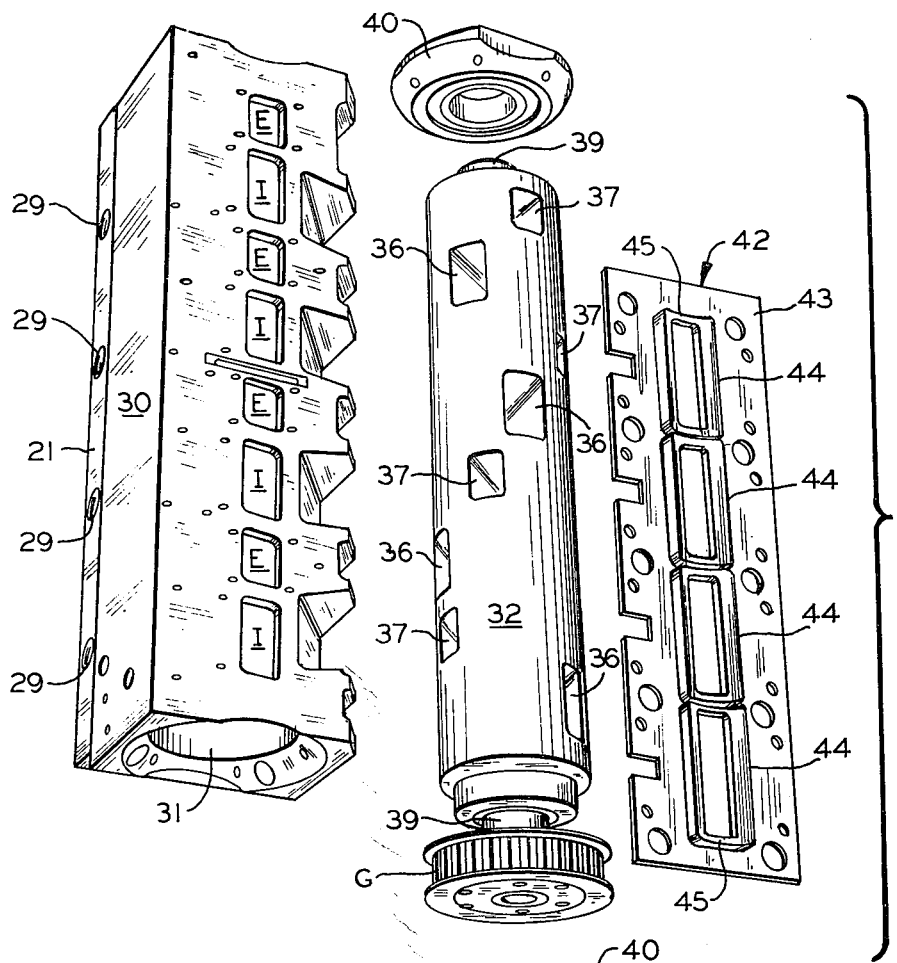
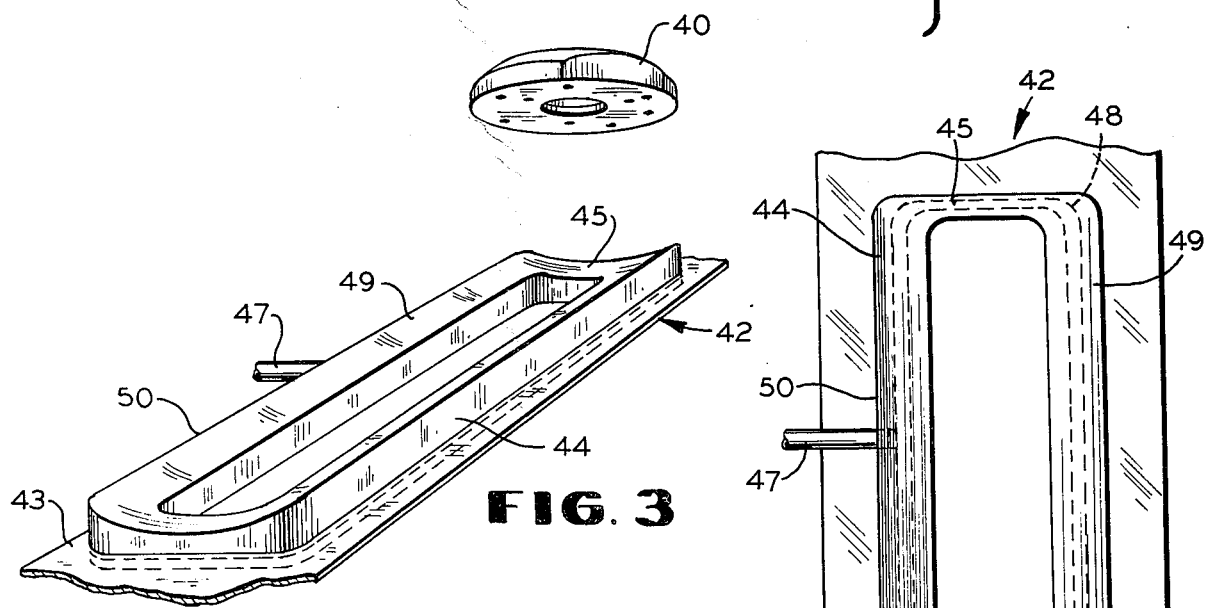
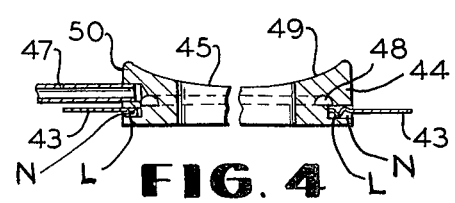
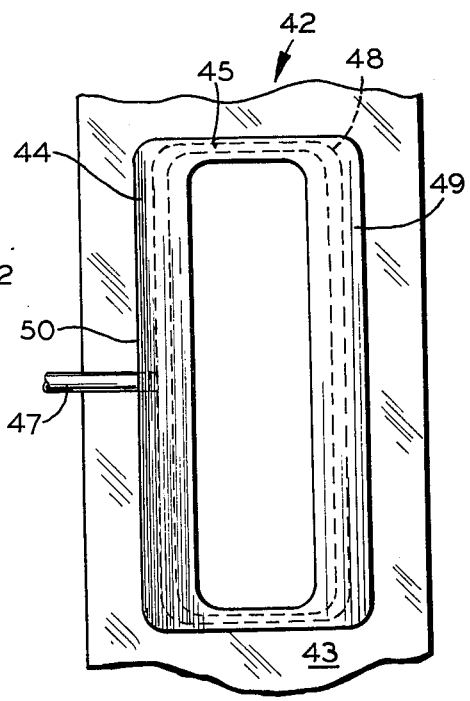
FIG. 2
FIG. 3
FIG. 4
FIG. 5

STRATIFIED CHARGE ENGINE

BACKGROUND OF THE INVENTION

The Clean Air Amendment of 1970, which established exhaust emission standards for 1975 and 1976 in light duty vehicles (passenger cars and light trucks), requires that the emissions of carbon monoxide and unburned hydrocarbons be reduced by at least 90 percent, as compared with 1970 emission control standards. Also the emissions of oxides of nitrogen from light duty engines are required to be at least 90 percent below the average of those actually measured from similar vehicles manufactured during the model year 1971.

The 1975 standards for cars and light trucks are:

0.41 grams per vehicle mile for hydrocarbons (HC);

3.4 grams per vehicle mile for carbon monoxide (CO); and 3.1 grams per vehicle mile for oxides of nitrogen ($NO_x$).

The 1976 model year standards are:

0.41 grams per vehicle mile for hydrocarbons;

3.4 grams per vehicle mile for carbon monoxide; and 0.4 grams per vehicle mile for oxides of nitrogen.

The Clean Air Amendments also require vehicle compliance with the above standards for 5 years or 50,000 miles, whichever occurs first.

United States and foreign automobile manufacturers have begun developing various prototype emission control systems which will meet the 1975 standards. These emission control systems have included so-called engine "add on" devices such as:

1. An exhaust-gas recycle (EGR) line and control valve designed to recycle about 10 percent of the exhaust flow to hold $NO_x$ emissions below 3 grams per mile.

2. A catalytic converter in the exhaust system to promote further oxidation of the HC and CO emissions from the engine; and 3. A thermal reactor within the exhaust system to promote further burning of HC and CO emissions prior to exhaust into the atmosphere.

Each of these systems has disadvantages. The exhaust gas recycling systems currently in use generally cause a loss of engine power due to a reduction of available air-fuel ratio variations required for smooth engine operation. The use of EGR requires fuel mixture enrichment to maintain adequate drivability which results in an appreciable fuel economy penalty.

Catalytic converters currently being developed require the use of oxidation catalysts comprising nobel metals such as platinum and/or palladium or base metals promoted with nobel metals deposited on both monolythic and pellet substrates within the engine exhaust system.

These catalytic systems have thus far demonstrated very poor durability and high cost — both in terms of initial component expense and fuel economy loss.

Thermal reactors, thus far developed, have required either fuel rich or fuel lean mixtures which have resulted in either substantially poor fuel economy (in the case of fuel rich mixture) or poor drivability (in the case of fuel lean mixtures).

Among alternate approaches to the "add on" emission control devices is a carbureted stratified charge engine. A prototype of this engine has been developed by Honda of Japan. The engine uses a conventional engine block, pistons and spark plugs. The cylinder head, however, is modified to comprise a small pre-combustion chamber which is in communication with a main combustion chamber. The spark plug is in the small pre-combustion chamber which is fed with a fuel rich mixture through a separate carburetor and by using a small third poppet valve. The main carburetor intake system feeds a fuel-lean mixture to the normal intake valve adjacent the main combustion chamber.

The fuel-rich mixture insures good ignition within the pre-combustion chamber. This mixture exits the pre-chamber and propagates a flame into the fuel-lean mixture in the main chamber to produce a burn of relatively long and uniform duration which reduces $NO_x$ formation and promotes total combustion of HC and CO inside the cylinder on the power stroke of the piston.

The Honda engine has been tested and has met the above 1975 standards without the addition of any "add on" emission control devices. It is apparent from the test results thus far published that the carbureted stratified charge engine offers several advantages over the alternate developments devised to meet the Clean Air Act standards, namely:

1. No exhaust treatment need be used in conjunction with the engine;

2. The engine is durable; the 1975 standards have readily been met after completion of the 50,000 mile durability testing as prescribed under the Clean Air Amendment;

3. Effects on vehicle performance are small; there is a slight loss in power for comparable engine displacement due to leaner operation and decreased volumetric efficiency. Fuel economy, as compared with non-stratified charge engines, is essentially unchanged with no fuel penalty resulting from the lowered emissions output; and 4. The engine can operate on regular leaded gasoline, unlike systems having catalytic converters for which lead is a catalyst poison.

Although the stratified charge principle is demonstrably advantageous — both from a clean air and fuel economy aspect — currently existing prototypes which have been tested are even more complex than conventional automotive engines. First, the disclosed engines have a third poppet valve which must be timed in conjunction with engine intake. Second, these stratified charge engines require two separate carburetors having two mechanically linked throttle plates and two separate intake manifolds.

From the standpoints of production cost and post-production maintenance, it is believed that the additional complexity of the currently proposed stratified charge engines will prevent most of them from being readily mass produced in the near future.

The present invention is directed to a simplified apparatus for applying a stratified charge to an engine which eliminates the necessity of separate carburetion apparatus and multiple poppet valves per cylinder. The system comprises a rotary valve in combination with a novel bifurcated intake manifold which eliminates the need for any reciprocating valves, valve springs or cam shafts. It is believed that the present invention provides a stratified charge engine which will meet the Clean Air Act requirements, supra, without attendant manufacturing or maintenance difficulties which are present in even conventional automobile engines on the market.

SUMMARY OF THE INVENTION

The invention comprises a cylindrically shaped, driven valve body mounted for rotation within the head of a reciprocating internal combustion engine. The valve body is driven through a timing belt by the engine crankshaft. The valve body defines diametrically extending inlet and exhaust passages which are disposed for sequential alignment with a pre-combustion chamber, defined by the head, super-adjacent cylinders of the engine. Rotation of the valve body brings each cylinder — through a predetermined alignment and distribution of the passages within the valve body — into sequential communication with an inlet passage and then an exhaust passage. When the cylinder is in alignment with the inlet passage, an opposite end of the inlet passage is in alignment with a bifurcated inlet manifold which leads from a twin-throated carburetor. The inlet manifold defines a first passage for carrying a first lean fuel/air charge from one throat of the carburetor and a second passage for carrying a second rich charge from a second throat of the carburetor. Rotation of the valve body during the inlet stroke of a piston carries the inlet passage into initial communication with the first passage of the manifold, then with both of the first and second passages, and finally with exclusively the second passage of the inlet manifold, all while an opposite end of the inlet passage is in communication with the pre-combustion chamber.

As a piston within the cylinder moves on its downward inlet stroke, the inlet passage first admits the lean charge from the first passage through the pre-combustion chamber into the cylinders; then a combined lean and rich charge into the cylinder and, finally, an extremely rich charge in the top of the cylinder and particularly in the pre-combustion chamber in the cylinder head.

Further rotation of the valve body by the crankshaft brings both the inlet and the outlet passages of the valve out of communication with the cylinder. The piston then completes its compression stroke; compressing a lean charge in the cylinder and a very rich charge within the pre-combustion chamber. A spark plug within the pre-chamber ignites the rich mixture which propagates a flame front that spreads into the leaner mixture in the cylinder, providing a slow burning, uniform flame growth throughout the power stroke.

Further rotation of the valve brings the cylinder into communication with the exhaust passage which has rotated into communication with the exhaust manifold. The piston exhausts the combusted gases, completing a single four-stroke cycle.

Means are provided for sealing the rotary valve, shielding exhaust heat from the valve body and for providing a variable inlet and exhaust valve timing. The valve seal comprises a diaphragm gasket member which is located adjacent an open end of the cylinders and the inlet and exhaust passages of the valve body. Arcuate seals are supported around openings defined by the diaphragm gasket member for sealing contact with the valve body. The inlet and exhaust passages, upon rotation of the valve body, move into registry with the opening defined by the diaphragm gasket to establish communication with the cylinder. Support means on the diaphragm gasket maintain each seal in contact with the valve body and simultaneously permit the seal of one material to thermally expand and contract at a rate different from that of the diaphragm gasket of a second, dissimilar material.

The exhaust shield comprises a heat retentive sleeve within the exhaust passage held in spaced-apart relationship from walls of the exhaust passage by spacers for providing an insulating void space between the sleeve and the passage walls.

The intake and exhaust timing mechanism comprises gate means adjacent the intake and exhaust manifolds which are movable, through actuating means in response to engine demand, into and out of the path of the intake charge and the exhaust gases.

BRIEF DESCRIPTION OF THE DRAWINGS

FIG. 2 is a perspective view of the charge applying apparatus shown in FIG. 1;

FIG. 3 is a perspective view of an embodiment of seals for the charge applying apparatus shown in FIG. 1;

FIG. 4 is a cross-sectional, end view of the seal shown in FIG. 3;

FIG. 5 is a top view of the seal shown in FIG. 3;

DESCRIPTION OF THE PREFERRED EMBODIMENTS

Figure 1:
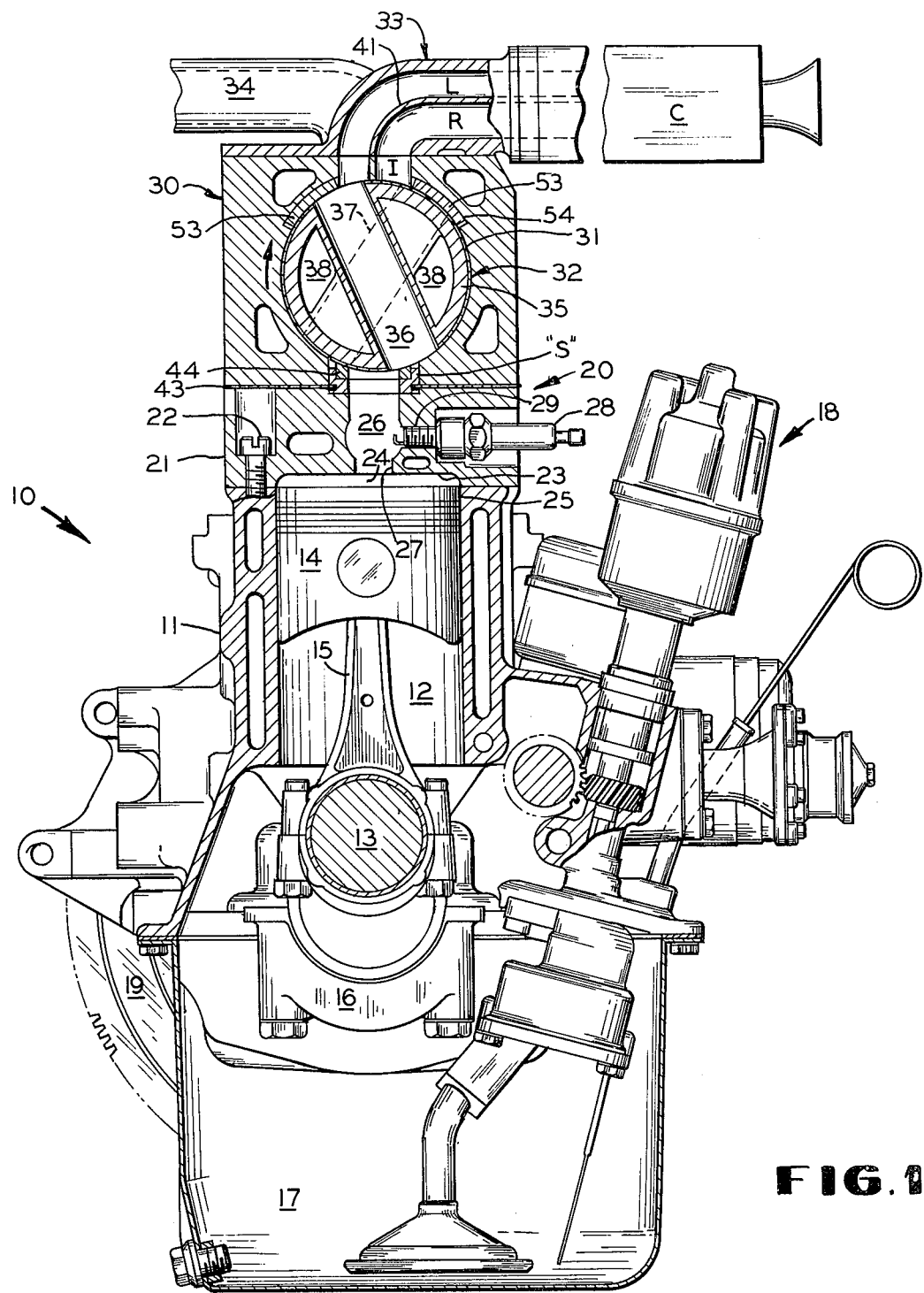
FIG. 1 is an end view of a four-cylinder, four-stroke cycle engine showing the charge applying apparatus of the present invention in cross section.

Referring to FIG. 1, a four-cylinder, four-stroke cycle engine 10, embodying the present invention, is shown. The engine 10 comprises a conventional block 11, cylinders 12, a crankshaft 13, a reciprocatable piston 14, within each cylinder 12 and drivingly connected to the crankshaft 13 by a connecting rod 15, main bearings 16, a sump 17, electrical system 18 and flywheel 19, all of which are well known in the art. The conventional head, and intake and exhaust manifolds have been eliminated and replaced with stratified charge applying apparatus 20 according to the present invention.

The charge applying apparatus 20 comprises a cast intermediate plate 21 which is connected to the block 11 by bolts 22. An intermediate seal (not shown), of any suitable head gasket material, is positioned between the intermediate plate 21 and the block 11.

The intermediate plate 21 defines, over each cylinder, a dome 23 which forms an upper surface of a primary combustion chamber 24, defined on its remaining sides by the cylinder walls 25 and the piston 14. A pre-combustion chamber 26 is also defined within the intermediate plate 21. The pre-combustion chamber 26 lies in direct communication, at an exit end, with each primary combustion chamber 24 and, at an entrance end, with valve passages which will be described below. At the exit end of the pre-combustion chamber 26 is a restricting neck 27, defined by the intermediate plate 21, which provides a restricted exit orifice for the ignited charge as will be explained below.

A spark plug 28 extends within the pre-combustion chamber through a bore 29 within the intermediate plate 21.

A rotary valve head 30 is connected over the intermediate plate 21. The valve head 30 defines an axial bore 31 therethrough for receiving a cylindrical rotary valve body 32, as is best shown in FIG. 2. A top side of the valve head defines sets of inlet ports I and exhaust ports E, over which respective inlet manifolding 33 and exhaust manifolding 34 (as shown in FIG. 1) is secured.

The valve body 32 comprises a light-weight frame 35, preferably of an aluminum alloy, having an outer metal sleeve surfaced with a hard chrome plate fitted onto the outer periphery of the frame 35. The frame 35 can also be made of cast iron. The body 32 defines:

1. Inlet passages 36 which extend transversely through the valve body 32. The inlet passages 36 are arranged along the axis of the valve body 32 for registry with the inlet ports I in the valve head 30 at predetermined points of rotation of the valve body 32 within the axial bore 31. Registry of one of the inlet passages 36 with one of the inlet ports I also brings an opposite end of the inlet passage 36 into communication with the pre-combustion chamber 26, as will be explained below.

2. Exhaust passages 37 which also extend transversely through the valve body 32. The exhaust passages are arranged along the axis of the valve body 32 for registry with the exhaust ports E in the valve head 30 at predetermined points of rotation of the valve body within the valve head 30. Registry of one of the exhaust passages 37 with one of the exhaust ports E also brings an opposite end of the exhaust passage 37 into communication with the pre-combustion chamber 26 as will be explained below.

The inlet and exhaust passages 36 and 37 are disposed within the valve body 32 so that rotation of the valve body 32 produces sequential registry of first one inlet passage 36 with one inlet port I and then one exhaust passage 37 with one exhaust port E per four-stroke cycle of each piston 14 as will be further explained.

3. Cooling passages 38 which extend axially through the valve body 32 for transportation of cooling water therethrough. The combination of axial flow cooling and light alloy metal of the valve body 32 provides efficient cooling of the body 32 and especially the walls of the inlet and exhaust passages 36 and 37.

The valve body 32 is carried on journals 39 for rotation within the axial bore 31 by bearings 40 which are connected to the valve head 30. The valve body 32 and the axial bore 31 are sized for close registry therebetween to facilitate sealing of the valve.

A timing gear G is connected through a timing chain or gear belt (not shown) to the crankshaft 13 for rotation of the valve body 32 in timed relationship with the crankshaft 13 at a ratio of 1:4. All rotation of the valve body, as discussed hereinafter is, therefore, in relation to the movement of a piston 14 within one of the cylinders 12 during a phase of a normal four-stroke cycle. Rotation of the valve body 32 shown in the drawings is in a clock-wise direction (see FIG. 1). Since the valving, timing, inlet, and exhaust apparatus for each cylinder is identical, most of the remaining description will be isolated to the forewardmost cylinder of the engine as shown in FIG. 1.

Referring now especially to FIG. 1, the inlet manifold 33 is connected for communication with each inlet port I in the valve head 30. Each inlet manifold 33 comprises a first passage L and a second passage R which extend from separate throats of, for example, a twin throated carburetor C or any other to the valve body 32. A dividing wall 41 extends the length of the manifold 33 to a point of sliding contact with the valve body 32 and, in conjunction with outer walls of the manifold 33, defines the passages L and R. The first passage L transmits an extremely lean fuel/air charge, or a pure air charge, from the carburetor to the inlet I. It has been found in practice that the engine of FIG. 1 operates most efficiently with a charge of pure air delivered from the carburetor through the first passage L. Depending on engine capacity and design demand characteristics, however, it may be necessary to inject a lean mixture of fuel and air into the first passage L.

The second passage R transmits an extremely rich fuel/air charge, or a pure fuel charge, from the carburetor to the inlet I. It has been found in practice that the engine of FIG. 1 operates most efficiently with a pure fuel charge in passage R. Design characteristics may again require the modification of this charge to a rich fuel/air charge depending on engine construction.

It can be seen that as an inlet passage 36 rotates into registry with an inlet port I and the precombustion chamber 26, the passage 36 moves into sequential communication first with manifold passage L, then both manifold passages L and R and, finally, exclusively with manifold passage R, as a trailing wall of the inlet passage 36 passes the dividing wall 41.

As one end of the inlet passage 36 moves in the above-described sequential registry with the inlet manifold 33, an opposite end of the passage 36 is in constant registry with the pre-combustion chamber 36. Thus as the piston 14 moves on its downward intake stroke, the inlet passage 36, rotating in time with the piston, introduces first a lean or pure air charge, then a mixed but lean fuel/air charge and finally a rich or pure fuel charge through the pre-combustion chamber into the cylinder. When the intake stroke is completed, the inlet passage 36, in cooperation with the bifurcated inlet manifold 37, has provided a very lean charge to the primary combustion chamber 24 and a rich charge to the pre-combustion chamber 26. The effect of this stratification will be discussed below.

Referring to FIGS. 2-5, a gasket/seal 42 is situated at the base of the rotary valve head and forms lower inlet/outlet ports for the valve head 30. The gasket/seals 42 comprise a diaphragm gasket 43 made of a resilient, heat resistant metal such as stainless steel. The diaphragm gasket 43 is complementary in shape and size to the valve head 30 and is positioned between the head 30 and the intermediate plate 21 to prevent leakage of gases under pressure between the intermediate plate 21 and the valve head 30.

Integral valve seals 44 are mounted within the diaphragm gasket 43 in spaced-apart relationship. Each seal is integrally secured around an opening within the gasket 43 which is located for registry with an inlet and an exhaust passage 36 and 37 to establish open communication between the manifolds 33 and 34 and each respective cylinder 12 of the engine 10.

An arcuate side 45 of each seal 44 is shaped for a contiguous fit with the rotary valve body 32. The resilient diaphragm gasket 43 is biased toward the valve body 32 to maintain the integral valve seals 44 in a contiguous sealing relationship with the outer wall of the valve body 32.

Referring to FIG. 1, the valve seals 44 may comprise molded carbon rings which are maintained in position within the diaphragm gasket 43 by a retainer shoe "S" which is inserted about the periphery of each opening within the diaphragm 43. The provision of an arcuate carbon seal 44 has been found to be particularly advantageous because of the tendency of carbon to retain water against the arcuate surface 45. The seal 44 can therefore be lubricated by water given off during the combustion process within the combustion chambers 24 and 26.

The seals 44 can also comprise sintered iron or bronze which is molded into the seal shape. The sintered metal seals are provided with a capillary oil lubricating feed system 46 as shown in FIGS. 3, 4 and 5. The capillary oil feed system 46 comprises an oil feed line 47 leading from the engine lubrication system to an oil duct 48 which is molded circumferentially within the sintered iron or bronze seal 44.

In this embodiment of the valve seal 44, an inner stratum 49 and the arcuate surface 45 of the seal 44 are porous while an outer seal side wall 50 is non-porous and impervious to lubricating oil flow therethrough. After oil under pressure is fed through the oil feed line 47 to the oil duct 48, the oil percolates from the duct through the porous inner stratum to the arcuate surface 45 which becomes saturated with the lubricant. The valve body 32, in contact with the lubricant, thus slides in contact with the arcuate sealing side 45. The provision of either the carbon or sintered metal seal against the rotary valve body 32 provides an impervious barrier to the exit of gases under pressure either between the intermediate plate 21 and the valve head 30 or around the rotary valve body 32. Typical problems with burning and erosion of the valve body 32 are greatly reduced by the seal.

Referring to FIG. 4, the diaphragm gasket 43 is provided with a corrugated lip L which extends around the circumference of each opening within the gasket 43 for receiving a seal 44. A notch N within the sidewall 50 extends around the seal 44 for receipt of the corrugated lip L therein. The lip L extends within the notch N for retaining the seal 44 in place within the gasket 43. It can be seen in FIG. 4, that the lip L extends substantially but not completely the depth of the notch N to permit the seal 44 to "float" within the supporting gasket 43. The "float" permits the carbon or sintered metal seal 44 to grow or shrink in response to engine temperature variations at a rate different from the growth or shrinkage of the dissimilar material of the diaphragm gasket 43. The seal is thereby carried in contact with the valve body 32 without being placed under heat stress which would otherwise be attained during operation of the engine.

As shown in FIG. 4, the lip L can, in cross section, comprise a down-turned bend (as shown in the left-hand embodiment of FIG. 4) or as an "S" shaped curve, as shown in the right-hand embodiment of FIG. 4. Either of these embodiments facilitates gas loading of the lip L area within the notch N. Thus in the event that gas under pressure in the chambers 24 and 26 bleeds into the notch N, the gas will exert a force on the inside curves of either of the corrugated lips L to expand the corrugations into tight engagement against sidewalls of the notch N within the seal 44. The diaphragm gasket seal 42 thereby provides a means for sealing the rotary valve body 32 and for maintaining the seal against failure through heat stresses encountered within the engine under operating conditions.

Figure 7:
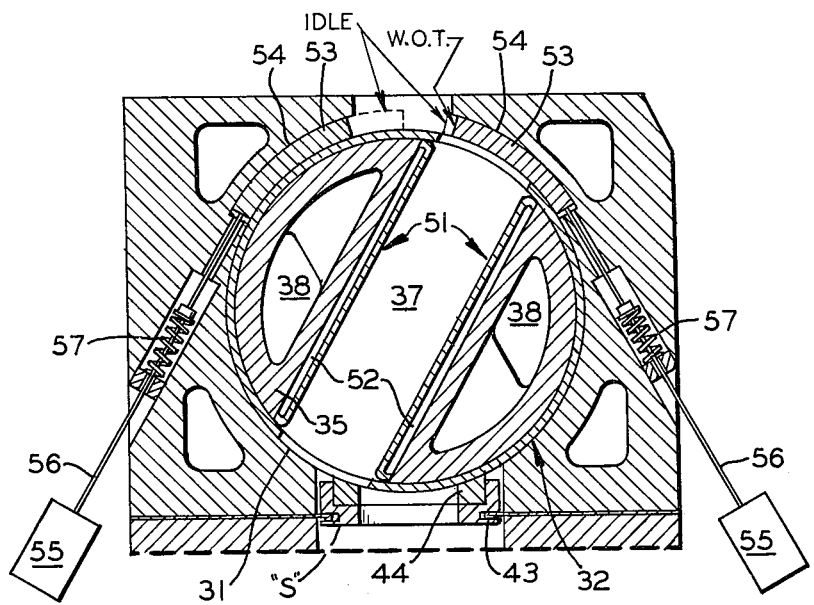
FIG. 7 is a detailed cross-sectional, end view of the charge applying apparatus of FIG. 1.
Figure 8:
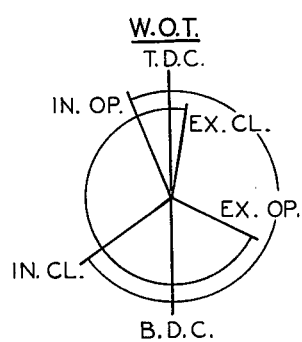
FIG. 8 and FIG. 9 are comparative graphs of the valve timing of the charge applying apparatus of the present invention.
Figure 9:
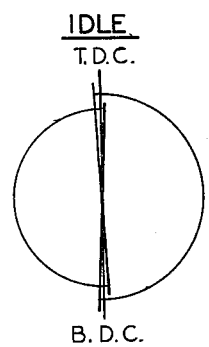
Figure 10:
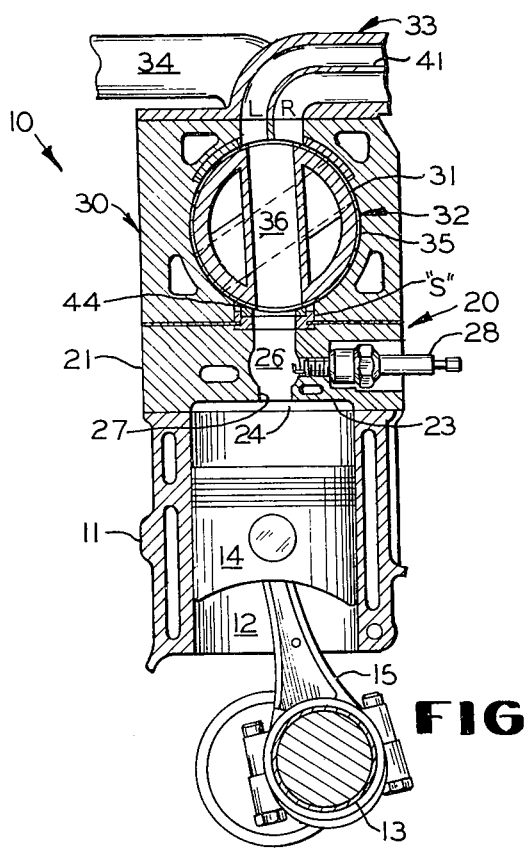
FIGS. 10–16 are cross-sectional views of an engine having the charge applying apparatus of the present invention and showing the relative position of the parts at points during a normal four-stroke cycle.

Referring especially to FIG. 7, an exhaust passage 37 within the valve body 32 is shown. The exhaust passage 37 is protected from high temperature exhaust gases which pass therethrough during an exhaust stroke of the piston by an inner liner 51 having a metal surface of a heat absorbtive alloy, such as stainless steel, which extends across each wall of the exhaust passages 37. Opposite ends of the inner liner 51 are bent for registry with an extending portion of the sleeve of the valve body 32. The bends act as spacers to maintain the surface of the liner 51 away from each wall of the exhaust passage 37. A dead air space 52 between the wall of the exhaust passage 37 and the liner 51 provides an insulating layer against exiting hot exhaust gases.

As the exhaust passage 37 rotates into registry with a respective pre-combustion chamber 26, at one end, and an exhaust port E, at its opposite end, during an exhaust cycle of the piston, the hot, highly pressurized gases are released from the cylinder 12 to flow over the surface of the liner 51. During engine operation, therefore, the liner 51 will be maintained at a red-hot temperature.

In the event that a catalytic converter or thermal reactor is used in treating the exhaust of the engine, the red-hot temperature of the liner is advantageous in that the exit temperature of the exhaust gases is maintained at a high level which promotes the treating activity of either the catalytic converter or a thermal reactor.

Referring now to FIGS. 10–16 the basic operation of the engine 10 through a complete four-stroke cycle is shown. Beginning at FIG. 10, the forward piston 14 of the engine 10 is shown in its intake stroke. As the piston 14 approaches approximately half the distance toward bottom dead center, the valve body 32 has carried the inlet passage 36 into open registry with both manifold passages L and R as explained above.

Figure 11:
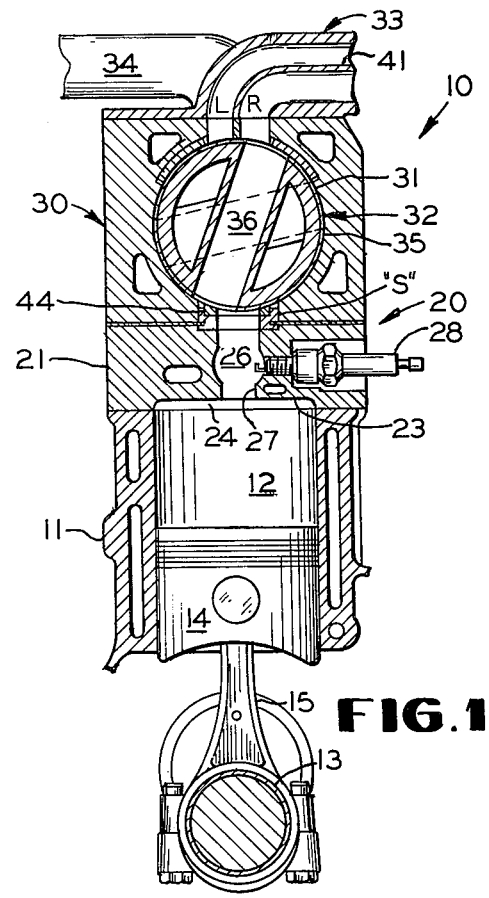

As the piston 14 reaches bottom dead center, as shown in FIG. 11, the inlet passage 36 has rotated sufficiently far that the trailing wall of the passage 36 has passed the dividing wall 41, placing the pre-combustion chamber in communication with exclusively the rich or pure fuel manifold passage R.

Figure 12:
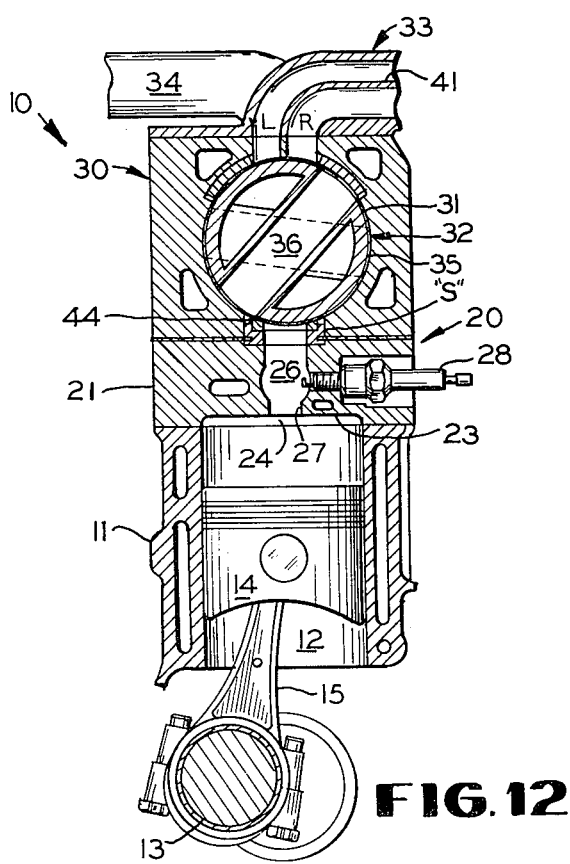

As the compression stroke begins as shown in FIG. 12, the inlet passage 36 has rotated beyond the point of registry with the pre-combustion chamber thus "closing" the valve body 32 to the pre-combustion chamber 26 and the primary combustion chamber 24.

Figure 13:
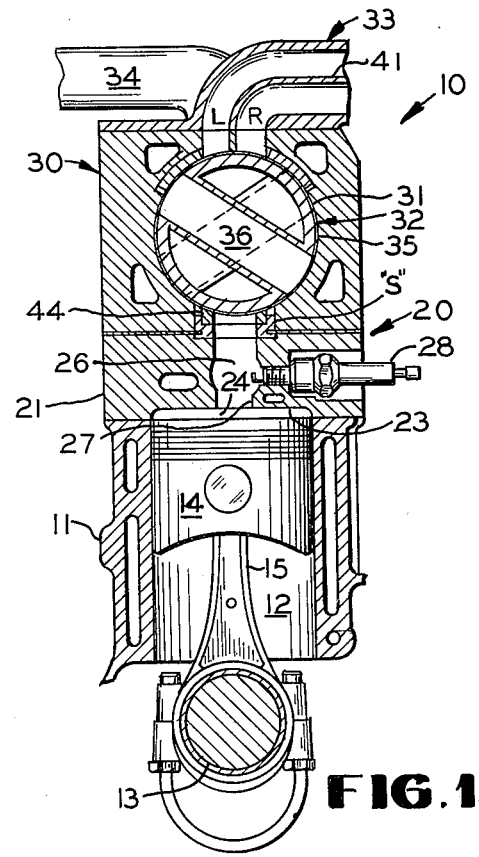

With the valve body 32 still rotating but in a "closed" attitude, the compression stroke is completed, as is shown in FIG. 13. Upon completion of the compression stroke, the relatively lean fuel/air charge in the primary combustion chamber 24 is in a stratified layer below an extremely rich charge compressed in the pre-combustion chamber 26.

Ignition takes place in the pre-combustion chamber as the spark plug ignites the very rich mixture therein. A flame front from the rich mixture propagates out through the restricting neck 27 into the primary combustion chamber 24 and ignites the lean mixture therein. The flame front builds in the lean mixture at a uniform rate throughout the power stroke.

Figure 17:
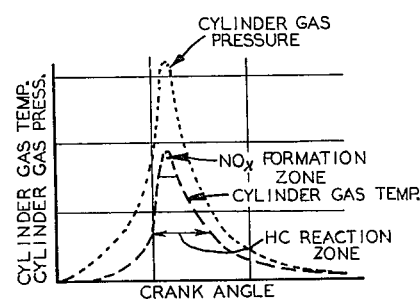
FIGS. 17 and 18 are comparative graphs of pressure-temperature curves between conventionally charged engines and engines having the charge applying apparatus of the present invention.
Figure 18:
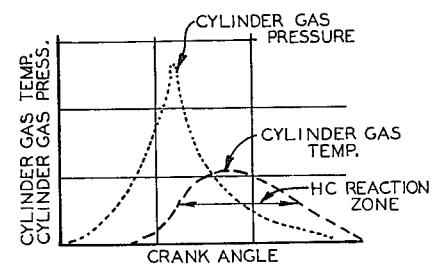

The combustion pressure temperature curve of the stratified charge as the flame propagates from the pre-combustion chamber 26 and through the primary combustion chamber 24 during the power stroke is illustrated in FIG. 18. FIG. 17 shows a comparative pressure temperature curve of a conventional non-stratified charge. When ignition takes place, at a point near top dead center (left-hand side of the graphs), cylinder pressure in both engines builds rapidly, as indicated by the dotted line curves.

In the conventional engine, the gas temperature increases at a rapid rate to reach a high peak followed by a rapid fall-off within a short duration of movement of the crank toward bottom dead center, as shown in the dashed-line curve of FIG. 17. This short duration/high peak ignition curve first provides a short time during which minimum hydrocarbon combustion temperatures are maintained and second achieves a high enough point to form oxides of nitrogen.

The temperature curve of the slowly propagating flame produced in the stratified charge, however, provides a long-duration burn above minimum hydrocarbon combustion temperature and at the same time, achieves a peak temperature which is below that required to produce oxides of nitrogen.

As compared with the conventional engine therefore, the production of HC and NO pollutants during the power stroke is significantly — if not completely — eliminated in the stratified charge engine.

Figure 14:
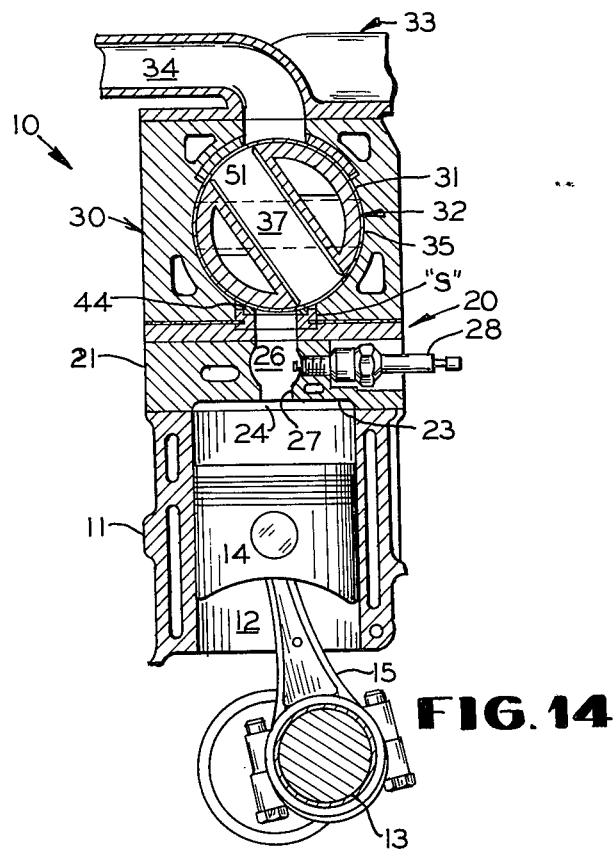
Figure 15:
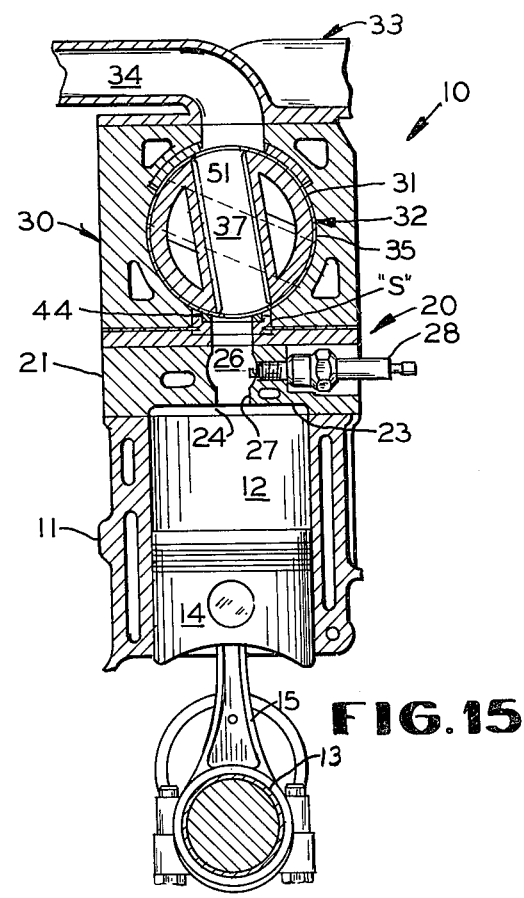
Figure 16:
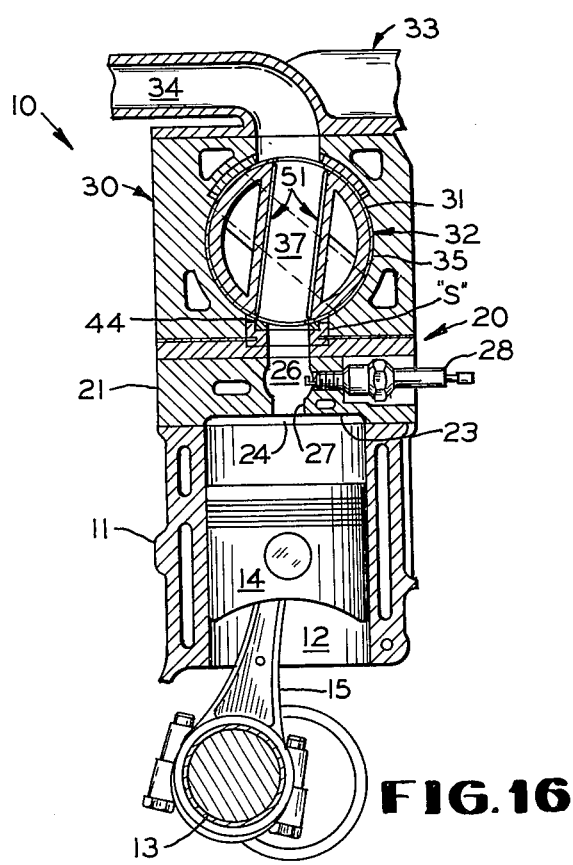

As the piston 14 completes its power stroke as shown in FIG. 14, the valve body 32 rotates the exhaust passage 37 into registry with the exhaust port E and the pre-combustion chamber 26. After the engine reaches bottom dead center, shown in FIG. 15, the exhaust stroke commences as shown in FIG. 16. Exhaust gases are driven from the combustion chambers 24 and 26 over the liner 51 and into the manifold 34. The crankshaft 13 continues to rotate the valve body 32 in timed relationship and carries the piston 14 again to top dead center where the intake stroke again commences. It can be seen that when the intake stroke is completed and the inlet passage 36 is "closed", a portion of the extremely rich charge from manifold passage R is trapped in the inlet passage 36. When the inlet passage 36 is again brought into registry with manifold passage L and the pre-combustion chamber 26, the trapped rich charge therein is drawn into the cylinder as the intake stroke commences. In this manner, even with pure air being supplied to manifold passage L a very lean fuel/air charge is immediately introduced into the cylinder 14 when the inlet passage first moves into registry with the pre-combustion chamber 26.

Now referring to FIGS. 6–9, an apparatus for varying the timing of the inlet and exhaust passages 36 and 37 is shown. Arcuate slide seals 53 are within oppositely extending arcuate channels 54 on opposite sides of each inlet port I and each exhaust port E. The slide seals 53 are fitted for complementary, contiguous registry with the valve body 32 and form upper seals for the body 32 adjacent the inlet and exhaust ports I and E. The slide seals 53 are, furthermore, extendable from a retracted position within the channel 54 to a restricting position within the path of the inlet or exhaust ports I or E as indicated by the dashed lines of FIGS. 6 and 7.

Figure 6:
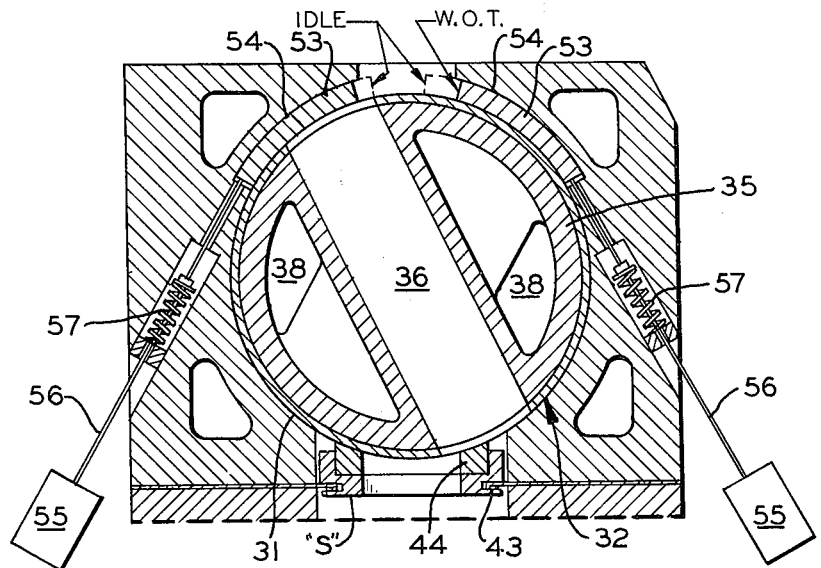
FIG. 6 is a detailed cross-sectional view of part of the charge applying apparatus shown in FIG. 1.

As shown in FIG. 6, the slide seals 53 are movable by means of an actuating mechanism 55 which can comprise any suitable apparatus for moving the seals 53 in response to engine demand. For example, the actuating means 55 can be connected for vacuum operation to move sets of timing rods 56 which are connected to the seals 53. The seals 53 are biased away from their restricting position by bias springs 57 connected to the timing rods 56. An increase in vacuum within the actuating mechanism 55 moves the seals 53 toward their restricting position. Therefore, connection of the actuating mechanism 55 to a port below a throttle plate (not shown), for example, will cause the seals to be urged to their restricting position during engine idle conditions (a high vacuum condition) and toward their retracted position during open throttle conditions (a low vacuum condition).

To accomplish timing of the registry of an inlet passage 36 with an inlet port I and a pre-combustion chamber 26, the slide seals 53 are moved in response to engine demand as described above. Thus when the engine is in an idle condition, the slide seals 53 extend from the opposing channels 54 into the restricting position as shown in FIG. 6. Movement of the left-hand seal, as viewed in FIG. 6, causes the intake passage 36 to move into registry with the inlet port I later than when the seal 53 is in its retracted position. Movement of the right-hand seal 53 into the restricting position causes the inlet passage 36 to move out of registry with the inlet port I relatively sooner.

Similarly, movement of the left-hand seal 53, as viewed in FIG. 7, causes the exhaust passage 37 to move into registry with the exhaust port E later than when the seal 53 is in its retracted position. Likewise, movement of the right-hand seal 53 into the restricting position causes the exhaust passage 37 to move out of registry with the exhaust port E relatively sooner.

The provision of variable timing in response to engine demand is significant because in modern engine design it is usual to effect the opening of the inlet valve before the piston reaches the top of the exhaust stroke. The valving is timed so that the exhaust valve closes after the inlet has opened so that there is overlap — a predetermined period when both valves are open together. This valve overlap is provided to produce maximum power during wide open throttle or high demand periods of engine operation. In the high demand condition, high velocity escaping exhaust gases during an exhaust stroke, create a near-atmospheric pressure (or a slightly negative pressure) within the exhaust port. At the same time, a charge in the induction column is under a positive pressure.

When the inlet valve opens on the exhaust stroke, therefore, the positive pressure charge in the induction manifold sweeps into the cylinder and forces remaining combusted gases out through the open exhaust valve. The scavenging effect of the new charge pushing out the old assures that a maximum pure charge is drawn into the engine, absent substantially all combusted gases.

Furthermore, in order to assure that a maximum charge is introduced into the cylinder, the inlet valve is commonly closed at a point after the piston reaches the bottom of the intake storage. During high demand, the positive pressure of the charge within the induction manifold maintains a positive flow into the cylinder even though the piston has begun its upward travel on the compression stroke.

It is also common practice to cause the exhaust valve to open at a point before the piston reaches the bottom of the power stroke in order to assure that the exhaust valve is completely open throughout the exhaust stroke. During periods of high demand, the piston speed, as well as the highly efficient combustion environment of the cylinder, assures that relatively few unburned hydrocarbons or raw fuel escape through the exhaust passage.

This above-described valve timing provides a relatively ideal combustion environment within the cylinder during periods of engine demand. Therefore, a conventionally timed valving system in an automotive engine has a cycle similar to that illustrated in FIG. 8. In that cycle, the intake valve opens at approximately 22° of crank angle before top dead center and closes at 66° after bottom center. The exhaust opens at 65° before bottom center and closes at 24° after top center.

Under idle conditions, however, the above-described timing becomes detrimental to engine operation. During idle, there is a high degree of vacuum in the intake tract. When the piston reaches the top of its travel during the exhaust stroke, the pressure of the gases inside the cylinders is considerably above that of atmosphere, while inside the induction manifold it is a good deal below. Therefore, at the moment of opening the inlet valve, there is a pronounced difference of pressure across the valve orifice which causes some of the exhaust gases to be drawn into the intake manifold. When the piston begins to move down on the intake stroke, a portion of the inspired charge will consist of exhaust gases, thus reducing combustion efficiency within the cylinder.

Furthermore, because the exhaust valve typically opens prior to the completion of the power stroke the charge within the cylinder begins to exhaust before combustion in the relatively poor environment is complete. This results in the emission of unburned hydrocarbons and even raw fuel into the exhaust manifold, increasing the fuel consumption of the engine and also emissions output.

The provision of the adjustable slide seals 53, however, provides for variation in the timing of the inlet and exhaust passages 36 and 37 to smooth out engine idle operation and reduce fuel consumption and emission output. Thus as the opposing seals 53 are moved to the restricting position during engine idle, both ports 36 and 37 are caused to "open" late (due to the restriction caused by the right-hand seal 53) at top dead center and to "close" early (due to the restriction caused by the left-hand seal 53) at bottom dead center, as is depicted in a graph of FIG. 9.

As a result of the movement of the seals 53 into their restricting position, (1) valve overlap is virtually eliminated during idle and (2) the exhaust passage 37 does not move into registry with the exhaust port E until the piston reaches virtually bottom dead center. The elimination of both valve overlap and the early opening of the exhaust port in response to a reduction in engine demand assures that combustion gases will not be introduced into the inlet manifold passages L and R on the exhaust stroke and also assures that complete combustion takes place in the primary combustion chamber 24 prior to the "opening" of the exhaust passage 37. Engine idle speed can therefore be reduced without the conventional attendant rough running, high fuel consumption and high pollution output.

Figure 19:
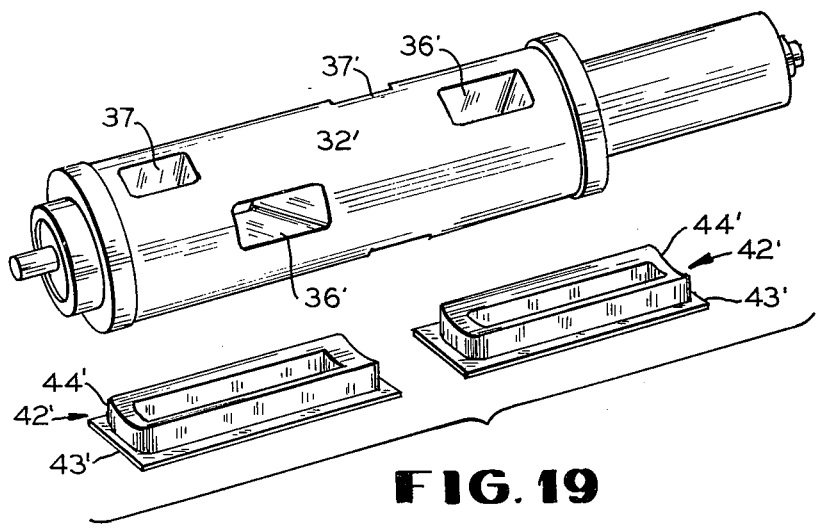
FIGS. 19 and 20 are perspective views of a second embodiment of a charge applying apparatus of the present invention.
Figure 20:
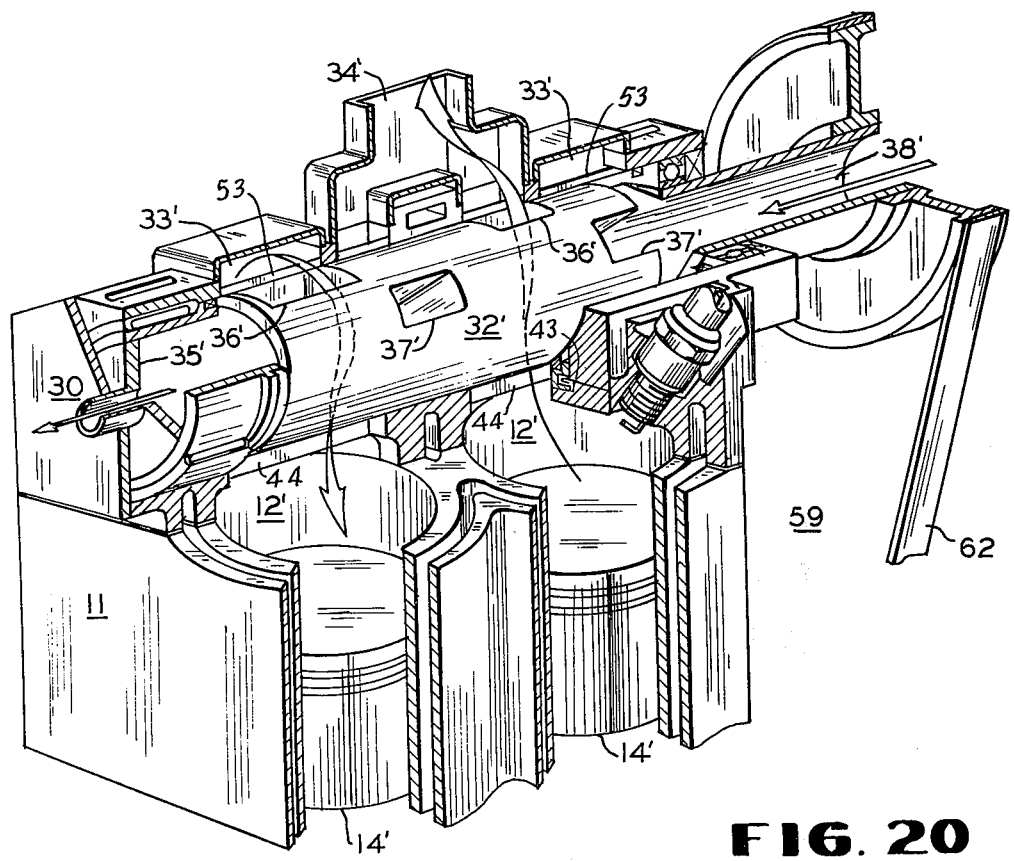

Referring to FIGS. 19 and 20 a second embodiment of an engine is shown. More specifically, a charge applying apparatus for a non-stratified charge engine 59 is disclosed. The engine 59 comprises pistons 14' within the cylinders 12' defined by a cylinder block 11'. A valve head 30' carries a rotary valve body 32' superadjacent the cylinders 12' for rotation within the head 30' by a belt 62 drivingly connected to a crankshaft (not shown). The valve body 32' comprises a light-weight, heat dissipative alloy frame 35' which defines inlet passages 36', exhaust passages 37' and axial cooling passages 38' similar in arrangement and function to those within the rotary valve body 32, previously described.

Integral diaphragm gasket/seals 42' are sandwiched between the valve head 30' and the cylinder block 11' to effect sealing of the cylinders 12' in the manner previously described with respect to the gasket seals 42. Integral arcuate valve seals 44' within openings defined by a diaphragm gasket 43' may comprise either molded carbon or sintered metal and are lubricated in the same manner as the above described diaphragm gasket/seals 42. Each exhaust passage 37' is protected against high temperature exhaust gases by an inner liner 51' identical in structure and function to the liner 51 described above.

The engine is aspirated through a conventional carburetor (not shown) in manifolding 33' and 34' leading to respective passages 36' and 37'. The light-weight rotary valve head 30' and body 32', however, provide a greatly simplified valving structure. The engine 59 is extremely efficient, light-weight and has few moving parts. Furthermore, the valve body 32' is provided with a slide seal timing apparatus for the intake and exhaust, as previously described, to assure maximum engine performance.

Although it is believed that the above embodiments of the present charge applying invention are readily adaptable to high volume production, in use durability and simplified maintenance, it is to be understood that the invention contemplates all variations from the present embodiments which fall within the spirit and scope of the following claims.

What I claim is:

1. Engine apparatus for applying a stratified charge to an internal combustion engine having at least one cylinder, a piston mounted for reciprocation within the cylinder and drivingly connected to a crankshaft, and charge forming means, said apparatus comprising:
   1. a cylinder head disposed over the cylinder and defining a primary combustion chamber bounded by the cylinder walls, the piston and said head;
   2. a pre-combustion chamber defined within said head in open communication with the primary combustion chamber;
   3. a cylindrical valve body disposed for rotation within said head adjacent said pre-combustion chamber;
   4. inlet means connected to said head for separately delivering a first lean charge from the charge forming means and a second rich charge from the charge forming means to said valve body;
   5. an outlet manifold connected to said head and having one end in open communication with said valve body;
   6. inlet and exhaust passages defined within said valve body and disposed for establishing respective, sequential communication upon rotation of said valve body between said precombustion chamber, said inlet passage, and said inlet means for delivering a lean charge, then a rich charge, and upon further rotation to establish communication between said pre-combustion chamber, said outlet passage and said outlet manifold during respective intake and exhaust strokes of said engine.

2. Engine apparatus according to claim 1, wherein said inlet means comprises a bifurcated inlet gallery having parallel passageways extending adjacent said valve body, said parallel passageways including a first passage for delivering a lean charge and a second passageway for delivering a rich charge to said valve body.

3. Engine apparatus according to claim 2, wherein said inlet means comprises a peripheral outer walls and a central wall positioned between said peripheral outer walls, said outer walls and said central wall defining said parallel passageways.

4. Engine apparatus according to claim 1, including a gasket/seal disposed adjacent said valve body, said gasket seal comprising a resilient heat resistant diaphragm gasket having at least one opening therein for registry with said inlet and exhaust passages within said valve body, sealing and lubricating means located circumferentially about said opening, said sealing and lubricating means defining an arcuate surface for contacting registry with an outer surface of said cylindrical valve body and for lubricating said arcuate surface.

5. Engine apparatus according to claim 4 wherein said diaphragm gasket includes a corrugated lip for receipt within a notch defined circumferentially about said sealing and lubricating means, said lip extending substantially the depth of said notch for floatingly supporting said sealing and lubricating means.

6. Engine apparatus according to claim 4 wherein said sealing and lubricating means includes a liquid-permeable sintered metal valve seal body.

7. Engine apparatus according to claim 4 wherein said sealing and lubricating means includes a molded carbon valve seal body.

8. Engine apparatus according to claim 4 wherein said sealing and lubricating means includes a liquid permeable sintered metal valve seal body, an oil conduit in communication within said valve seal body for delivering lubricating oil, an oil passageway defined circumferentially within said valve seal body, whereby delivery of oil through said oil conduit to said oil passageway effects saturation of said liquid permeable sintered metal.

9. Engine apparatus according to claim 1 wherein said cylindrical valve body defines passages extending through said body for carrying cooling water through said valve body and around said inlet and outlet passages.

10. Engine apparatus according to claim 1 wherein said cylindrical valve body comprises an aluminum frame defining said inlet and outlet passages and a hardened metal outer sleeve around said frame.

11. Engine apparatus according to claim 1 wherein said exhaust passage comprises a heat resistant sleeve spaced from said valve body to define an insulating air gap for shielding said valve body from hot exhaust gases exiting through said exhaust passage.

12. Engine apparatus according to claim 1 further comprising means for adjusting timing of the establishment of sequential communication of said inlet passage and said exhaust passage with said inlet means and said exhaust manifold respectively wherein the time of communication is controlled in response to engine demand when the piston is adjacent top dead center and also when the piston is adjacent bottom dead center during normal intake and exhaust cycles of the engine.

13. Engine apparatus according to claim 12 wherein said timing means comprises sets of opposing arcuate members within said head, each set being adjacent one of said inlet means or one of said outlet manifolds, on one side, and circumferentially adjacent one of said inlet or one of said exhaust passages on an opposite side of said arcuate members, said members being movable from a retracted position toward each other to a restricting position in interference with the path of communication established by said rotating valve body between said inlet passage and said inlet means and then said exhaust passage and said exhaust manifold.

14. Engine apparatus for applying a stratified charge to an internal combustion engine having at least one cylinder, a piston mounted for reciprocation within the cylinder, and drivingly connected to a crankshaft, and charge forming means; said apparatus comprising a cylinder head disposed over the cylinder, a precombustion chamber within said cylinder head, a primary combustion chamber, defined by the piston, walls of the cylinder and said cylinder head, in open communication with said precombustion chamber, a cylindrical valve body disposed for rotation within said head, inlet and exhaust passages diametrically extending through said valve body and disposed along said body for sequential registry of said inlet passage and then said exhaust passage with said precombustion chamber and inlet means for delivering an initial lean charge and a subsequent rich charge from the charge forming means through said inlet passage through said precombustion chamber and into said primary combustion chamber.

\* \* \* \* \*